Jan. 15, 1929.

S. J. MONK 1,698,764

WINDSHIELD WIPER

Filed March 23, 1928

Inventor,
Sidney J. Monk.

By

Attorney

Patented Jan. 15, 1929.

1,698,764

UNITED STATES PATENT OFFICE.

SIDNEY J. MONK, OF WASHINGTON, DISTRICT OF COLUMBIA, ASSIGNOR TO NORA MONK, OF WASHINGTON, DISTRICT OF COLUMBIA.

WINDSHIELD WIPER.

Application filed March 23, 1928. Serial No. 264,146.

The object of the present invention is to provide a structure of a novel character that will not scratch the glass of a windshield, will provide a better clamp for the wiper strips, and will produce a cushioned bearing for the loose or free portions thereof that will lessen the cracking and breaking of said strips.

Figure 1:
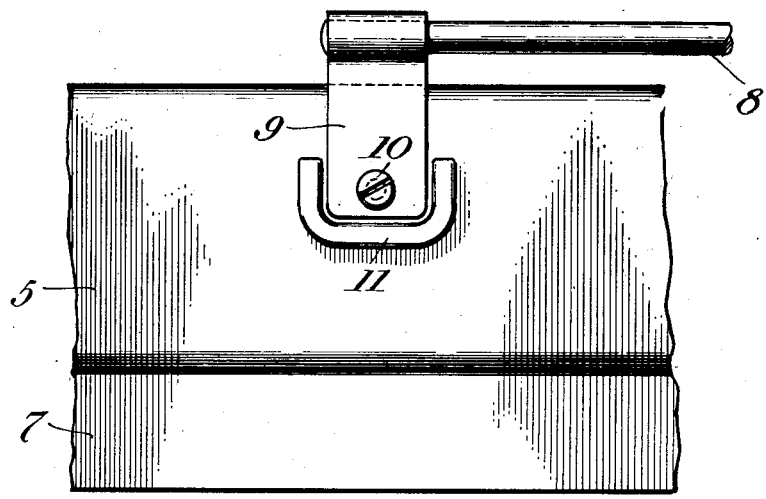
Figure 1 is a side elevation of a wiper constructed in accordance with the present invention.
Figure 2:
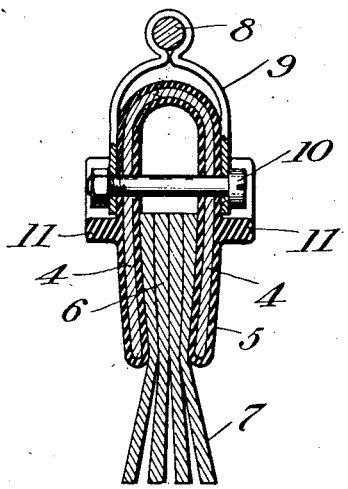
Figure 2 is a cross sectional view through the same.

Considering first the embodiment disclosed in Figures 1 and 2, a channeled holder of metal is employed, preferably formed by bending a sheet to form side walls 4. This metal body is embedded in an outer casing of rubber or other material of an analogous character, designated 5. The wiper strips are shown at 6 and are clamped in place by and between the walls 4 of the metal body, but are in actual contact with the softer material 5. The strips project beyond the body and material, as shown at 7 to form the usual wiping flaps. A carrier rod 8 is shown and is provided with a yoke 9 that embraces the structure in the usual manner and is secured thereto by a bolt 10. This yoke and the fastener are surrounded by ribs 11 formed of the material of the casing 5.

With this structure, it will be evident that no metal will engage the glass of the windshield as the wiper is caused to traverse the same even though there is sufficient play in the parts to permit the body to strike the glass because the metal parts are all enclosed and guarded by the material 5. Said material furthermore produces a better clamping surface for the strips 7 and as said strips bend against the material the danger of their being cut and broken is materially lessened.

Figure 3:
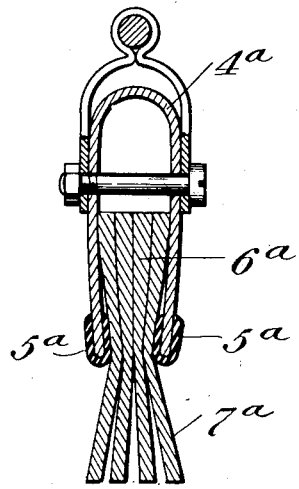
Figure 3 is a cross-sectional view of a slightly modified form of construction.

A modification of the above structure is shown in Figure 3, wherein the channeled metal body is designated 4ª and the free edges and margins only are surrounded by the rubber-like guard and clamping material 5ª. The wiping strips are shown at 6ª and are clamped between said marginal protector 5ª.

From the foregoing, it is thought that the construction, operation and many advantages of the herein described invention will be apparent to those skilled in the art, without further description and it will be understood that various changes in the size, shape, proportion and minor details of construction may be resorted to without departing from the spirit or sacrificing any of the advantages of the invention.

What I claim, is:

1. A wiper comprising a channeled holder, a guard of softer substance than the holder covering the margins thereof, and a flexible wiping body separate from the guard and clamped between the wals of the channel member and projecting beyond the channel member.

2. A wiper comprising a channeled holder, a guard of softer substance than the holder covering the inner and outer sides of the same and enclosing the free edges of the side walls thereof, and a flexible wiping body separate from the guard and clamped between the walls of the channel member, said body projecting beyond the channel member.

3. A wiper comprising a channeled holder, a guard of softer substance than the holder covering the inner and outer sides of the same and enclosing the free edges of the side walls thereof, a flexible wiping body separate from the guard material and clamped between the walls of the channel member, said body projecting beyond the channel member, and a carrier arm having a yoke embracing and secured to the holder, said guard having ribs surrounding the yoke and projecting beyond the sides of the same.

In testimony whereof, I affix my signature.

SIDNEY J. MONK.